United States Patent [19]

Kondo et al.

[11] Patent Number: 4,621,174

[45] Date of Patent: Nov. 4, 1986

[54] COMPOSITE SWITCH

[75] Inventors: Shiro Kondo; Kenji Sawada, both of Furukawa, Japan

[73] Assignee: Alps Electric Co., Ltd., Japan

[21] Appl. No.: 726,629

[22] Filed: Apr. 24, 1985

[30] Foreign Application Priority Data

Apr. 24, 1984 [JP] Japan .............................. 59-60545[U]

[51] Int. Cl.⁴ .............................................. H01H 9/00
[52] U.S. Cl. .................................. 200/5 R; 200/61.86; 200/314
[58] Field of Search ................... 200/5 E, 50 C, 16 C, 200/61.86, 153 J, 153 JH, 310, 313, 314

[56] References Cited

U.S. PATENT DOCUMENTS 4,383,147  5/1983  Raab et al. ..................... 200/50 C
4,517,422  5/1985  Black, III et al. .............. 200/5 E Primary Examiner—A. D. Pellinen
Assistant Examiner—Morris Ginsburg
Attorney, Agent, or Firm—Guy W. Shoup

[57] ABSTRACT

A composite switch equipped with a main switch whose contact is connected and disconnected by an operation member and a change-over switch whose contact is changed among plural positions. An auxiliary switch is provided in series with the main switch, whose switching member is positioned so that it is driven by a working member for operating the contact of the change-over switch.

4 Claims, 6 Drawing Figures

COMPOSITE SWITCH

FIELD OF THE INVENTION

The present invention relates to a composite switch which may be employed, for example, to switch on/off an air conditioner equipped within a vehicle and to adjust/change the airflow of a blower.

BACKGROUND OF THE INVENTION

As the air conditioning system of the vehicle, generally, the air conditioner and blower are employed. To control such a system, there are equipped a main switch to start/stop the air conditioner and a change-over switch to change the airflow of the blower. For this airflow change-over switch, a slide switch is employed mainly. While this airflow change-over switch has a stop position to stop blowing, if the air conditioner is in operation in spite of the switch being at the stop position, there results in such an inconvenience that a cooling coil is frosted. Therefore, when stopping the blower, the air conditioner must be stopped surely.

As apparent from the foregoing description, in order to stop surely the air conditioner at the time of stopping the blower, a composite switch was employed in the prior art which is made up by coupling together the main switch and the airflow change-over switch.

In more detail, the conventional composite switch will be described with reference to FIGS. 5 and 6.

In FIG. 5 illustrating the conventional composite switch, 1 is the main switch and 2 is the change-over switch. This main switch 1 is the so-called push-push type switch and employed for start/stop of the air conditioner of the vehicle. An operation member 3 of the main switch 1 has a heart-shaped grooved cam 3a, against the inner face of which a ball 4 is pressed by a spring (not shown). The operation member 3 is normally projecting in the A direction by the force of the spring (giving the off state). As the operation member 3 is pushed in the B direction, a contact turns on and, during this time, the ball 4 traces the inner face of the grooves cam 3a. When the ball 4 stops at a lock position (the $\alpha$ position) inside the grooved cam 3a, the operation member 3 is held there, so that the contact is also held in the on state. Then, if the operation member 3 is pushed further from the above state, the ball 4 departs from the lock position $\alpha$ and the operation member 3 returns in the A direction owing to the spring force thereby resulting in the switch-off state. In the foregoing structure, the ball 4 is designed so that it can move only in the right/left directions in the drawing within a slot 5a of a control member 5.

With respect to the change-over switch, it is made in the form of a frame by a case 6 of insulating material and a cover 7 of metal plate. Inside the frame a working member 8 made of insulating material is slidable freely. This working member 8 holds a sliding contact 8a, whereas on a surface 6a of the case 6 plural fixed contacts (not shown) are secured. Further, into the working member 8 a tip 9a of an operation lever 9 is projecting. This operation lever 9 is pivotable about a support point 10.

As the operation lever 9 is turned in the C direction, the working member 8 moves leftward in the drawing and the sliding contact 8a contacts with a left side contact, whereby the airflow caused by the blower is switched to a higher stage. From this stage, as the operation lever 9 is turned gradually in the D direction, the working member 8 moves in the right direction in the drawing. During this movement the sliding contact 8a comes successively into contact with other fixed contacts to change to an airflow-decreasing position. At the position where the operation lever 9 is turned up to the maximum in the D direction, the airflow terminates. At the same time, the working member 8 pushes an end portion 5b of the control member 5. While the control member 5 is positioned normally in the state shown in FIG. 5 owing to a spring, when pushed by the working member 8 it moves in the right direction in the drawing (see FIG. 6). Thus, the slot 5a of the control member 5 pushes the ball 4 in the right direction. Accordingly, even if the operation member 3 of the main switch 1 is locked at the B direction position thereby giving the on state of the contact, due to the foregoing movement of the control member 5 the ball 4 gets out of the lock position $\alpha$ of the grooved cam 3a, the operation member 3 returns immediately in the A direction, the main switch 1 turns off, and the air conditioner stops.

In the foregoing conventional composite switch, when the working member 8 of the change-over switch 2 moves in one direction the lock member 4 of the main switch 1 is moved forcedly in the releasing direction, whereby the switch 1 is turned off. That is, the operation member 3 of the main switch 1 itself is caused to return completely to the off direction. Accordingly, when to start again the air conditioner, the operation member 9 of the change-over switch 2 must be operated to commence blowing and the operation member 3 of the main switch 1 must be pushed again. These operations are troublesome during the vehicle driving and a driver is apt to forget to push the main switch 1 and other manipulation.

In addition, because the mechanical operation is performed to release the on state of the main switch 1, a mechanism for releasing the locked main switch 1 becomes complicated and there is a fear that the operation becomes incomplete.

Further, because the conventional composite switch has no means for indicating the operation state of the main switch 1, it sometimes becomes impossible to confirm the operation state and the like of the air conditioner, for example, during the night driving of the vehicle.

SUMMARY OF THE INVENTION

The present invention has been devised in view of the foregoing problems of the prior art, and its object is to provide a composite switch of the type in that a main switch can be turned off by the employment of a simple structure, the main switch circuit is automatically closed without need of re-operation of the main switch when a change-over switch is operated again, and the state of the main switch circuit is automatically displayed.

In summary, the present invention resides in a composite switch equipped with a main switch whose contacts are connected and disconnected in response to an operation member and a change-over switch whose contact is changed among plural positions, and is characterized in that an auxiliary switch is provided electrically in series with the contacts of the main switch, a display mechanism such as a lamp is provided which is actuated when both the main switch and the auxiliary switch are closed, and a switching member for switching the auxiliary switch is positioned so that it is driven by a working member for operating the contact of the change-over switch, such that the auxiliary switch is operated by the working member of the change-over switch to open/close the series switching circuit formed by the main switch and the auxiliary switch, and the open/close state of the main switch is displayed by the display mechanism.

BRIEF DESCRIPTION OF THE DRAWINGS

FIG. 1 through FIG. 4 illustrate an embodiment of the present invention in which FIG. 1 is a schematic diagram showing contacts and circuits of the composite switch;

FIG. 2 is a sectional view showing a display mechanism;

FIG. 3 is a plane sectional view showing the internal structure of the composite switch;

FIG. 4 is a perspective view showing the external appearance of the composite switch;

DETAILED DESCRIPTION OF THE INVENTION

The embodiment of the present invention will be described with reference to FIGS. 1 through 4 illustrating the same.

Figure 4:
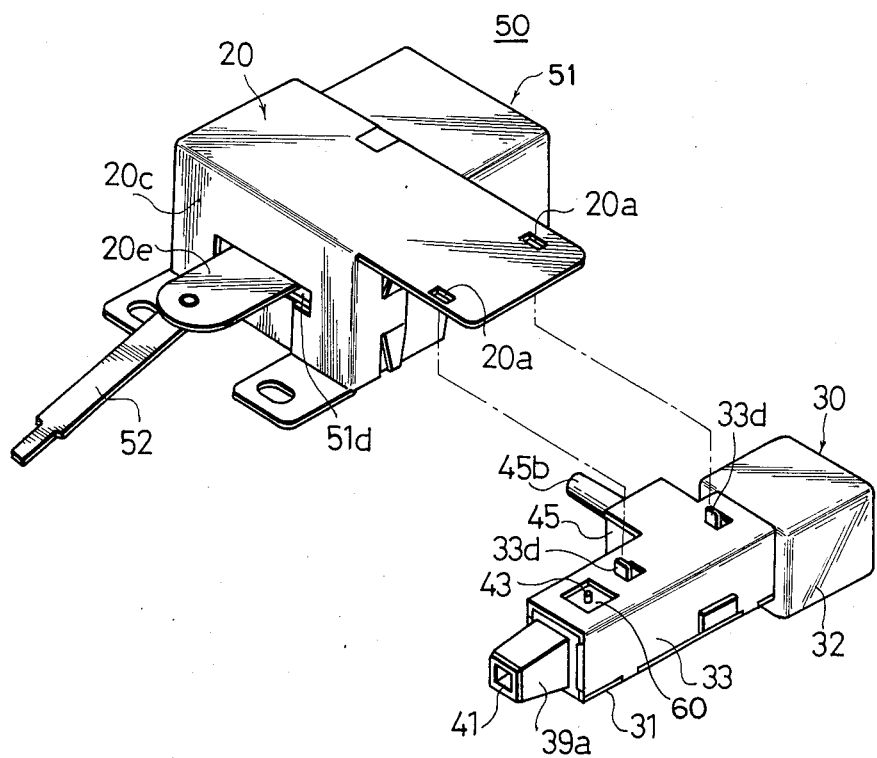
Figure 5:
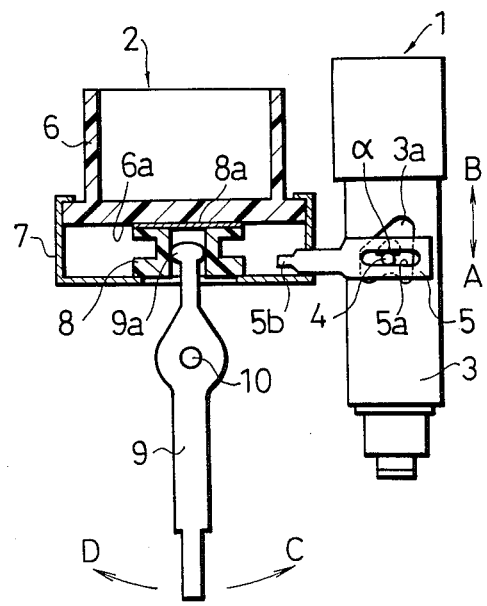
FIG. 5 is a sectional view showing the structure of the conventional composite switch.
Figure 6:
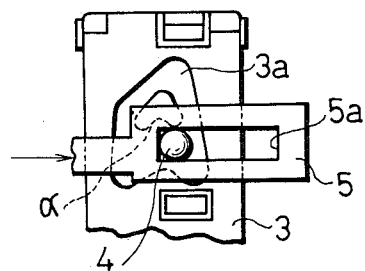
FIG. 6 is an enlarged view of a part of FIG. 5.

In FIG. 4, 20 is a metal frame which supports a main switch 30 and a change-over switch 50. In case the present composite switch is employed in the air conditioning system of the vehicle, the main switch 30 is used to switch the air conditioner on/off and the change-over switch 50 is used to regulate the airflow of the blower.

The structure of the main switch 30 is as follows: The main switch 30 includes a resin-made holder 32 mounted on a rear portion of an insulation substrate 31 and a metal plate-made cover 33 covering an upper side of the former.

Figure 1:
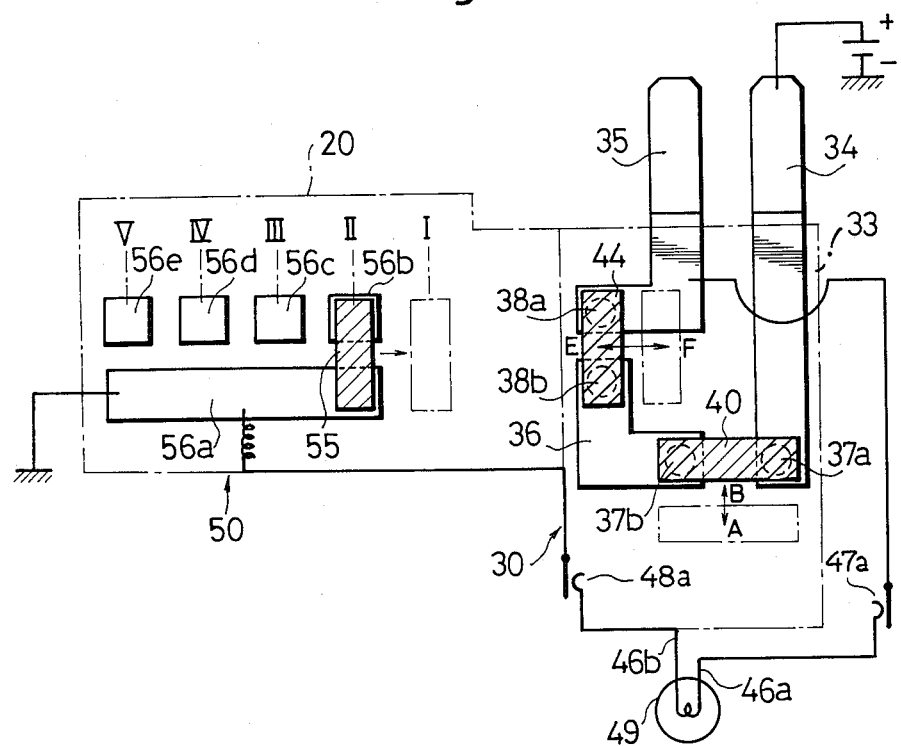

On the surface of the insulation substrate 31 there are provided two terminals 34 and 35 and a conductor plate 36 (see FIG. 1). The tip of the terminal 34 is fixed to the insulation substrate 31 by a contact pin 37a. Similarly, the tip of the other terminal 35 is fixed to the insulation substrate 31 by a contact pin 38a. Further, one end and the other end of the conductor plate 36 are fixed to the insulation substrate 31 by a contact pin 37b and a contact pin 38b, respectively. In this way, the fixed contacts are formed on the insulation substrate 31 by these pins, in which the contact pins 37a and 37b are electrically isolated from each other to form the fixed contacts of the main switch 30. Also, the contact pins 38a and 38b are electrically isolated from each other to form the contacts of an auxiliary switch. The main switch formed by fixed contacts 37a, 37b and the auxiliary switch formed by fixed contacts 38a, 38b are connected in series through the conductor plate 36 to form a series circuit for stopping the air conditioner.

At the front portion inside the cover 33 an operation member 39 is supported slidably in the A-B directions. At the tip of the operation member 39 an operation button 39a is provided integrally which projects from the cover 33. On the under surface of the operation member 39 a moving contact 40 is provided. This moving contact 40 is press abutted upon the insulation substrate 31 by a spring. The moving contact 40 is movable in the A-B directions together with the operation member 39 to open/close the fixed contacts 37a and 37b of the main switch 30. Between the operation member 39 and the holder 32 a return spring 42 is interposed. By the spring force of the return spring 42 the operation member 39 is urged normally in the A direction (the off direction of the main switch). On the upper surface of the operation member 39 a heart-shaped grooved cam 39c is formed. Projecting from the cover 33 above the grooved cam 39c a pin 43 is provided, the tip of the pin 43 is positioned so that it traces the inner face of the grooved cam 39c. The base portion of the pin 43 has a bend in it and is supported rotatably by the support means 60 secured to cover 33 (see FIG. 4).

Figure 2:
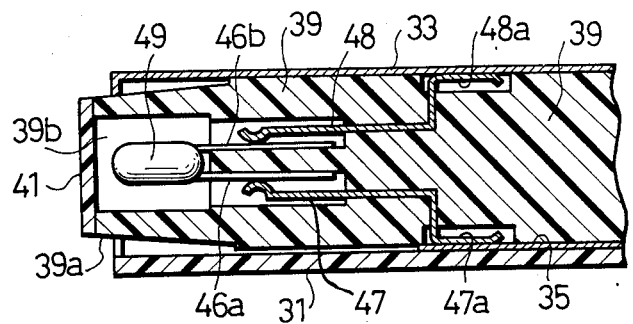

As shown in FIG. 2, in the tip of the operation member 39 (the tip of the operation button 39a) a hollow 39b is formed, the opening of the hollow 39b is covered by a transparent cover 41 made of acrylic, for example. Inside the hollow 39b a lamp 49 is stored as a display mechanism. In the operation member 39 a pair of metal strips 47 and 48 are buried, lead wires 46a and 46b of the lamp 49 are supported by these metal strips 47 and 48. At the root portions of these metal strips 47 and 48 sliding contacts 47a and 48a are formed integrally. The lower sliding contact 47a contacts slidingly with one terminal 35 on the insulation substrate 31, and the upper sliding contact 48a contacts slidingly with the inner face of the cover 33.

In the side portion of the holder 32 a hollow 32a is bored, inside the hollow 32a a switching member 45 is stored movably in the E-F directions. On the under surface of the switching member 45 a moving contact 44 is provided with a spring (not shown) interposed therebetween: As shown in FIG. 1, this moving contact 44 is for switching the fixed contacts 38a and 38b composing the auxiliary switch. Between the switching member 45 and the holder 32 a return spring 45a is interposed, by the spring force of this return spring 45a the switching member 45 is urged in the E direction (the on direction of the auxiliary switch). At the tip of the switching member 45 a projection 45b is formed integrally, this projection 45b is entering into a hole 51a bored in the side face of a case 51 of the change-over switch 50. On the upper surface of the cover 33 of the main switch 30 a pair of pawls 33d for fixation are formed through bending, these pawls 33d are inserted into attaching holes 20a bored in the frame 20, bent and secured through soldering, for example. By these means the main switch 30 is fixed to the frame 20. Further, the cover 33 and the frame 20 are electrically connected through that soldering.

The structure of the change-over switch 50 is as follows: 51 is the case of the change-over switch which is molded by resin. In the side face of this case 51 the hole 51a is bored as described hereinabove. The case 51 is held on the under surface of the metal-made frame 20.

Figure 3:
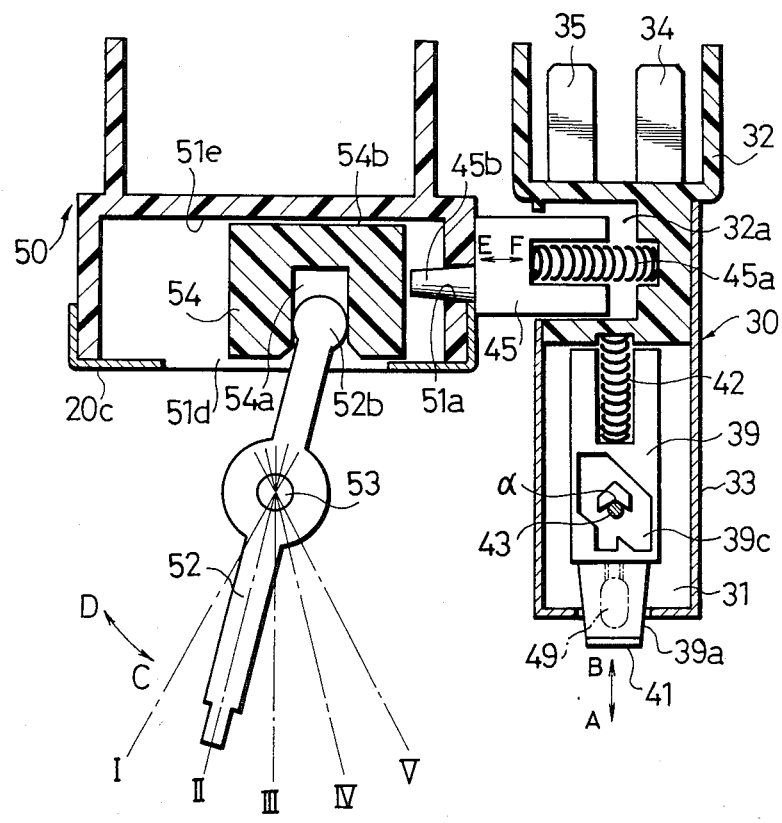

52 is an operation lever which is supported pivotably on a support arm 20e projecting in front of the frame 20. A coupling portion 52b at the tip of the operation lever 52 is inserted through a slit 51d formed in the front face of the case 51. As shown in FIG. 3, inside the case 51 a working member 54 is provided. This working member 54 is slidable laterally in FIG. 3. In the front face of the working member 54 a hollow 54a is formed, into this hollow 54a the coupling portion 52b of the operation lever 52 is inserted. Thus, if the operation lever 52 is turned in the C direction the working member 54 moves leftward, or, as the operation lever 52 is turned in the D direction the working member 54 moves rightward.

On a back face 54b of the working member 54 a sliding contact 55 is attached. This sliding contact 55 has a rectangular shape as shown in FIG. 1. On an inner surfsace 51e of the case 51 fixed contacts 56a through 56e are provided. As shown in FIG. 1, 56a out of the fixed contacts 56a through 56e is the common contact, and the other contacts 56b through 56e are arranged in accordance with their switching positions. The sliding contact 55 functions as to selectively connect the common contact 56a to any one of the contacts 56b through 56e.

The projection 45b of the switching member 45 for switching the auxiliary switch is positioned inside the case 51 so as to oppose to the right portion of the working member 54 (see FIG. 3).

As shown in FIG. 1, the common contact 56a of the change-over switch 50 is electrically connected to the frame 20. Thus, the common contact 56a is electrically connected to one lead wire 46b of the lamp 49 through the cover 33 of the main switch 30 and the sliding contact 48a slidingly contacting with the cover 33. The other lead wire 46a of the lamp 49 is electrically connected to the terminal 35 of the main switch 30 through the moving contact 47a. Further, when the moving contact 40 of the main switch 30 and the moving contact 44 of the auxiliary switch are in the closed state as shown in FIG. 1, i.e. connecting across both terminals 34 and 35, the lead wire 46a of the lamp 49 and the terminal 34, are connected through both moving contacts 44 and 40 and the conductor plate 36. Between the common contact 56a of the change-over switch 20 and the terminal 35 a certain voltage is applied. Thus, when the two moving contacts 40 and 44 are moved to form a closed circuit the lamp 49 lights.

Now, the operation of the composite switch having the foregoing structure will be described.

When the main switch 30 is off, the operation member 39 is projecting in the A direction by the force of the spring 42. At this state, as shown in FIG. 1, the moving contact 40 integral with the operation member 39 is at the position indicated by the alternate long and short dash line, and the main switch formed by the two fixed contacts 37a and 37b is in the nonconducting state. If the operation button 39a is pushed in the B direction to start the air conditioning system of the vehicle, the moving contact 40 moves to the position indicated by the hatchings in FIG. 1, and the two fixed contacts 37a and 37b are electrically connected. In the course of movement of this operation member 39, the tip of the pin 43 traces the inner face of the grooved cam 39c and is captured at the lock position (indicated by α in FIG. 3) of the grooved cam 39c, thus, the operation member 39 is held at this position. When to switch off the main switch 30, the operation button 39a is pushed again in the B direction. By this operation the tip of the pin 43 comes out of the lock position α, and the operation member 39 returns in the A direction by the force of the return spring 42.

The air flow of the blower can be changed by the operation lever 52 of the change-over switch 50. As the operation lever 52 is turned in the D direction as shown in FIG. 3 to assume position I, the working member 54 moves to the right-end position inside the case 51. At this time, the sliding contact 55 supported by the working member 54 comes to position I in FIG. 1. At this position, because it does not contact any of the fixed contacts 56a through 56e, the change-over switch 50 is in the off state and the blower is stopped. As the operation lever 52 is turned successively in the C direction to set positions II-V, the working member 54 slides leftward inside the case 50. At position II, as shown in FIG. 1, the sliding contact 55 connects fixed contacts 56a to fixed contact 56b. In this state the airflow of the blower is in the low stage. Similarly, when the operation lever 52 is at position III, IV or V, the sliding contact comes successively into contact with respective contacts 56c, 56d or 56e while contacting with the contact 56a serving as the common contact. At position III the airflow is in the medium first stage, at position IV it is in the medium second stage, and at position V it is in the high stage.

As described hereinabove, the projection 45b of the switching member 45 holding the moving contact 44 of the auxiliary switch is inserted into the right-end position of the case 51 in the drawing. Thus, as the operation lever 52 comes to position I, i.e., when the blower is stopped the working member 54 moved to the right-end portion of the case pushes the projection 45b to shift the switching member 45 rightward (in the F direction) in the drawing. Thus, as the result of movement of the moving contact 44 to the alternate long and short dash line position shown in FIG. 1, the auxilliary switch formed by the contacts 38a and 38b is switched to non-conducting state. Therefore, even if the main switch comprised of contacts 37a and 37b is in the conducting state by means of the moving contact 40 of the main switch 30, the series circuit is opened because the moving contact 44 of the auxiliary switch is separated.

Accordingly, when the operation lever 52 of the change-over switch 50 is at position I and the blower is stopped, the air conditioner does not start even if the operation button 39a of the main switch 30 is pushed. Then, from this state, if the operation lever 52 is moved to position II and so forth to start the blower, the working member 54 departs from the projection 45b and the switching member 45 returns leftward in the drawing owing to the return spring 45a. As a result, the moving contact 44 shifts to the position where the fixed contacts 38a and 38b are again connected so that the air conditioner starts. Similarly, if the operation lever 52 is changed to position I to stop blowing while both the blower and the air conditioner are in operation, the air conditioner stops automatically.

When the two moving contacts 40 and 44 are closed, one lead wire 46a of the lamp 49 is connected to the contact 34 through the terminal 35, moving contact 44, conductor plate 36 and moving contact 40. On the other hand, the other lead wire 46b of the lamp 49 is connected to the common contact 56a through the cover 33 and frame 20. Thus, when both the moving contacts 40 and 44 are closed, the lamp 49 lights. On the contrary, in case either one of the moving contacts 40 and 44 is opened at the alternate long and short dash line position, the foregoing circuit is opened and the lamp 49 is unlit. That is, only when the air conditioner is energized by the series circuit formed by the main switch and the auxiliary switch the lamp 49 lights, so that the operation state of the air conditioner can be recognized.

Modifications of the composite switch according to the present invention will be described.

While, in the illustrated embodiment, as the contact structure the auxiliary switch includes the moving contact 44 and two fixed contacts 38a and 38b, a contact structure composed of a leaf switch may be employed as another embodiment of the auxiliary switch.

While, in the illustrated embodiment, as the display mechanism the lamp 49 is stored inside the operation member 39, this lamp 49 may be held at a stationary position. In this case, one lead wire 46a of the lamp 49 is connected directly to the terminal 35 and a certain voltage is applied between the other lead wire 46b and the terminal 34.

While, in the illustrated embodiment, the lead wire 46b of the lamp 49 is connected up to the common contact 56a through the cover 33 and frame 20 because the common contact 56a of the change-over switch 20 is kept at the earth potential, in place, the cover 33 may be grounded directly.

Further, the display mechanism is not necessary to be limited to the lamp 49, it may be made up by another illumination member such as a light emitting diode, or a mechanical display mechanism in which a certain display is presented by a magnetic force, for example, when a certain voltage is impressed.

As apparent from the foregoing description, the present invention produces the following effects:

(1) The composite switch according to the present invention is equipped with the main switch whose contact is connected and disconnected by the operation member and the change-over switch whose contact is changed among the plural positions, and characterized in that the auxiliary switch is provided in series with the main switch, and the switching member for changing the contact of the auxiliary switch is positioned so that it is driven by the working member for operating the contact of the change-over switch, whereby the main switch changes always to the off state when the change-over switch comes to a certain position. Therefore, in case the present composite switch is employed in the air conditioning system of the vehicle, for example, where the switching between start and stop of the air conditioner is performed by the main switch and the change-over of the airflow of the blower is performed by the change-over switch, the air conditioner is always stopped when the blowing is terminated and the frosting on the cooling coil does not occur.

(2) Because the on/off state of the air conditioner is realized by the use of the auxiliary switch there is no need to push the operation button in order to restore the on state of the air conditioner, whereas such restoring operation was required in the case of employing the conventional main switch that is mechanically turned off. And, the main switch is automatically changed to the on state in response to the operation of the change-over switch. Thus, there is no need to operate the main switch in order to start the air conditioner each time the blowing is to be started. Accordingly, the driver can operate safely, for example, the air conditioning system of the vehicle including the present invention.

(3) Because the display mechanism is provided which is actuated when both the main switch and the auxiliary switch are closed, it is assured always whether the circuit of the main switch is closed or not, i.e., whether the air conditioner is in the operating state or not. Thus, the operation becomes reliable. Specifically, if the lamp serving as the display mechanism is stored inside the operation member, no space is required for mounting the same, and the switch body becomes compact.

While the preferred embodiment has been described, variations thereto will occur to those skilled in the art within the scope of the present inventive concepts which are delineated by the following claims.

What is claimed is:

1. A composite switch comprising
   a main switch whose contacts are connected and disconnected by actuation of an operation member, and
   a change-over switch whose contact is changed among plural positions,
   an auxiliary switch provided electrically in series with the contacts of said main switch to form a series circuit,
   a display mechanism electrically coupled to said series circuit for indicating when both said main switch and said auxiliary switch are closed, and
   a switching member for switching said auxiliary switch positioned so that it is driven by a working member for operating the contact of said change-over switch such that the auxiliary switch is opened when the working member is moved to an off position.

2. A composite switch as set forth in claim 1, wherein said display mechanism is a lamp, said lamp being mounted on said operation member, and connected electrically to said series circuit through sliding contacts provided on said operation member.

3. A composite switch as set forth in claim 1, wherein said main switch is a start/stop switch for an air conditioner of a vehicle, and said change-over switch is an airflow changing switch of a blower.

4. A composite switch as set forth in claim 3, wherein said auxiliary switch opens when said change-over switch comes to a stop position of the blower thereby to stop the air conditioner irrespective of the on/off state of said main switch.

* * * * *